United States Patent
Bernhardt et al.

(10) Patent No.: US 6,405,806 B1
(45) Date of Patent: Jun. 18, 2002

(54) VEHICLE IMPLEMENT INTERFACE

(75) Inventors: Gerd Bernhardt, Hänichen; Mario Wünsche, Radeberg; Sergiy Fedotov, Dresden, all of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/605,240

(22) Filed: Jun. 28, 2000

(30) Foreign Application Priority Data

Jul. 13, 1999 (DE) .......................................... 199 32 612

(51) Int. Cl.$^7$ .............................................. A01B 51/00
(52) U.S. Cl. ...................................... 172/272; 172/439
(58) Field of Search .............................. 172/272, 439, 172/448, 677, 680, 684.5

(56) References Cited

U.S. PATENT DOCUMENTS

| 2,791,341 A | 5/1957 | Michaels et al. ............ 214/141 |
| 6,149,180 A | * 11/2000 | Haws ......................... 172/272 |

FOREIGN PATENT DOCUMENTS

| DE | 2225753 C3 | * | 3/1981 |
| DE | 3337654 | * | 5/1985 |
| DE | 3440625 C2 | * | 4/1996 |
| DE | 19623391 A1 | * | 1/1997 |
| DE | 19747949 A1 | * | 5/1999 |
| FR | 2312932 | * | 12/1976 |
| FR | 2694316 | * | 2/1994 |
| GB | 2 178 290 | | 2/1987 |
| NL | 9001313 | * | 1/1992 |

OTHER PUBLICATIONS

ISO 6489–3 "Agricultural vehicles–Mechanical connections on towing vehicles–Part 3: Tractor drawbar", 1992 pp. 1–3.

* cited by examiner

Primary Examiner—Christopher J. Novosad (57) ABSTRACT

An implement interface for mounting on a chassis of a vehicle includes a telescopic boom pivotally coupled to the vehicle chassis so that the boom is pivotal about an essentially horizontal axis. The boom includes a housing which is pivotally coupled to the vehicle chassis and an arm which is slidably received by the housing. A carrier is mounted on a free end of the arm. A three-point hitch is mounted on the boom and has lower links coupled to the carrier, has an extendable upper linkage coupled to the boom, a lifting arm coupled to the carrier, a lifting brace connecting the lifting arm to one of the lower linkages, and a lift cylinder for vertically pivoting the lifting arm. A locking mechanism fixes the boom relative to the chassis. A hydraulic cylinder unit is coupled to the sliding arm and operable to move the sliding arm in a longitudinal direction. A pressure-operated piston/cylinder unit is coupled between the housing and the chassis and is operable to vertically pivot the boom.

8 Claims, 7 Drawing Sheets

VEHICLE IMPLEMENT INTERFACE

BACKGROUND OF THE INVENTION

The invention relates to an implement interface for attaching an implement to the rear or front of a vehicle, such as an industrial or agricultural tractor.

Industrial or agricultural vehicles, such as tractors, in addition to performing transport tasks, are primarily used for carrying out tasks in the field. For this purpose, a suitable implement is attached to the working vehicle.

Since the tractor must be coupled to various implements in order to carry out different tasks, the implement interface between the motor vehicle and the implement is of particular importance. The term implement interface refers to all devices which are required for coupling the implements to the vehicle and, if so required, for supplying them with power.

A so-called three-point hitch, e.g., as defined by ISO 730 or DIN 9674, is a conventional implement interface provided on most modern tractors and similar agricultural vehicles includes. Such a hitch usually includes two lifting arms that are connected to one another by means of a lifting shaft, and a corresponding hydraulic lifting cylinder engages each of the lifting arms. Each lifting arm is connected to a corresponding lower linkage by means of a lifting rod or a lifting spindle, and the lower linkage carries a lower coupler. In addition, the three-point hitch includes an upper linkage with a third, central upper coupler.

Such a three-point hitch makes it possible to easily and rapidly attach implements to the tractor. First, the tractor is moved near the parked implement. The implement is then coupled to corresponding receptacles of the implement interface so that the vehicle and the implement form a functional unit. If so required, a power take-off shaft of the vehicle is connected to an input shaft of the implement. In addition, electric and hydraulic connections for transmitting power and signals can be provided between the working vehicle and the implement. The implement can be raised and adjusted with respect to its height within a limited range by actuating the lifting cylinders in order to move the implement between its transport position and the desired working position. In this case, the implement frequently does not require a separate chassis. Despite the fact that the three-point hitch can be used for many tasks, its functions are still limited.

SUMMARY OF THE INVENTION objective of the present invention is to provide an implement interface which can perform functions not performed by a conventional three-point hitch.

These and other objects are achieved by the present invention wherein an implement interface includes a telescopic boom which is mounted on a vehicle chassis, frame or body and which is pivoted about a substantially horizontal axis. The boom includes an outer housing and an arm which slides telescopically in the housing. Lower linkages of a conventional three-point hitch are coupled to a free end of the boom. An extendable upper linkage is directly or indirectly coupled to the boom. This results in a pivotable implement interface which can be adjusted with respect to its height and which can perform all the tasks normally performed by a conventional three-point hitch. The telescopic boom makes it possible to lift an implement (or the like) very high compared to the lifting high of a normal 3-point hitch. This makes it possible to lift the implement and to load it on a trailer. Implements can be moved with expanded degrees of freedom and an expanded lifting range. With this interface, the vehicle may be used as a conventional towing vehicle with a customary implement interface or as a functional loader. If the implement is a plow, the plow can be raised after the normal working operation (plowing) to such a degree that the implement can be deposited on a trailer or an elevated storage platform without additional means.

Because of the simple and rapid loading of the implement, the vehicle can be moved rapidly between different working locations. For example, the implement may be loaded onto a trailer after the work at one location is completed, and then the trailer is attached to the vehicle and driven to a new location at a high speed. An implement may be raised to an elevation such that the implement can be placed on shelves or trailers without first separating the implements from the three-point hitch.

Hitch lower linkages, and if required, other attachments and towing implements, may be coupled or mounted on a carrier which is attached a free end of the boom. Different carriers can be mounted on the boom in order to adapt to different requirements, without modification or changing of the boom.

Preferably, the interface includes a locking device which is operable to selectively fix the free end of the boom and/or the carrier relative to the vehicle chassis, such as when the boom is in a lowered work position. If this locking device is engaged, the hitch forces are transmitted directly to the rear axle or to the vehicle chassis, without being transmitted to the boom. Thus, the boom can be designed for relatively small loads.

The interface may include a lifting arm is coupled to the free end of the boom or to the carrier, and the lifting arm can be vertically pivoted by a lifting cylinder. This lifting arm is connected to one of the lower linkages by lifting brace, rod or cylinder, and the lower linkages retain their conventional functions.

Additional attachments may be coupled to the free end of the boom or on the carrier so that towed implements or trailers can be attached to the vehicle. For example, a trailer drawbar may be grasped while on the ground and hydraulically moved into the operating position. Electric and/or hydraulic connections which are used to transmit power or signals may also be provided on the boom or the carrier.

In a preferred embodiment, the boom may guide a arm which is coupled to the upper linkage, and which can be displaced in the longitudinal direction of the boom. An upper linkage coupled to the free end of the arm may be extended and retracted by means of the arm, and the arm can be oriented essentially parallel to the boom. The telescopic guidance of the arm in the boom results in a stable double-telescopic rear interface.

Preferably, double-acting hydraulic piston/cylinder units are used to pivot the boom and extend the arm, and are coupled between the vehicle chassis and the boom, and between the boom and the arm, and are supplied with hydraulic fluid from the vehicle hydraulic system. Preferably, two pivoting cylinders are arranged parallel to one another, and have one end coupled to the vehicle chassis and an upper end coupled to the boom housing so that the implement can be moved vertically.

An upper linkage cylinder may be integrated into the upper linkage and/or into the arm in order to extend and retract the coupler of the upper linkage relative to the boom. The length of the upper linkage may be adjusted with such an upper linkage. In this case, the implement may be maintained in a horizontal position within a lower lifting range by correspondingly controlling the upper linkage cylinder, and within an upper lifting range by correspondingly controlling the arm cylinder.

In order to raise the implement interface to a substantial height, the boom of one preferred embodiment includes a housing which is pivotally coupled to the vehicle chassis and an extendable insert that is guided by the housing and is used to extend the length of the boom. A carrier is preferably mounted within the free end of the insert and carries a three-point hitch and, if required, other attachments and towing implements.

Preferably, the insert is telescopically guided within the housing, and both have rectangular profiles for structural rigidity. In certain applications, the boom may have three sections that are concentrically inserted into one another. With such a telescopic boom, the coupling of implements and digging with an earth scoop can be achieved by horizontal extension and retraction of the telescopic arm, without having to move the tractor. A hydraulic piston/cylinder unit may be coupled between the housing of the boom and an extendable insert or between the respective sections of the boom in order to extend and retract the sections.

An adapter can be mounted on the three-point hitch and used to receive special implements that require special implement interfaces and which cannot be attached to a conventional three-point hitch. With an appropriate adapter, this interface may be used as a conventional front-end loader, and front-end loader tools, such as an earth scoop, the fork of a forklift, etc., can be attached to the three-point hitch.

Preferably, the pivoting system is designed so that the coupling plane is maintained vertical or in another desired alignment independently of the incline of the boom, so that the implement maintains a certain desired alignment relative to the ground during a series of tasks, even if the boom has been pivoted vertically. A level control unit is provided for controlling the pivoting cylinder, arm cylinder, upper linkage cylinder, lifting cylinder and/or extension cylinder so that the implement is maintained in the desired alignment relative to the ground independently of the incline of the boom. The implement alignment and position can be monitored by a suitable sensor in order to determine an actual value signal for the level control.

DESCRIPTION OF THE PREFERRED EMBODIMENT

Figure 1:
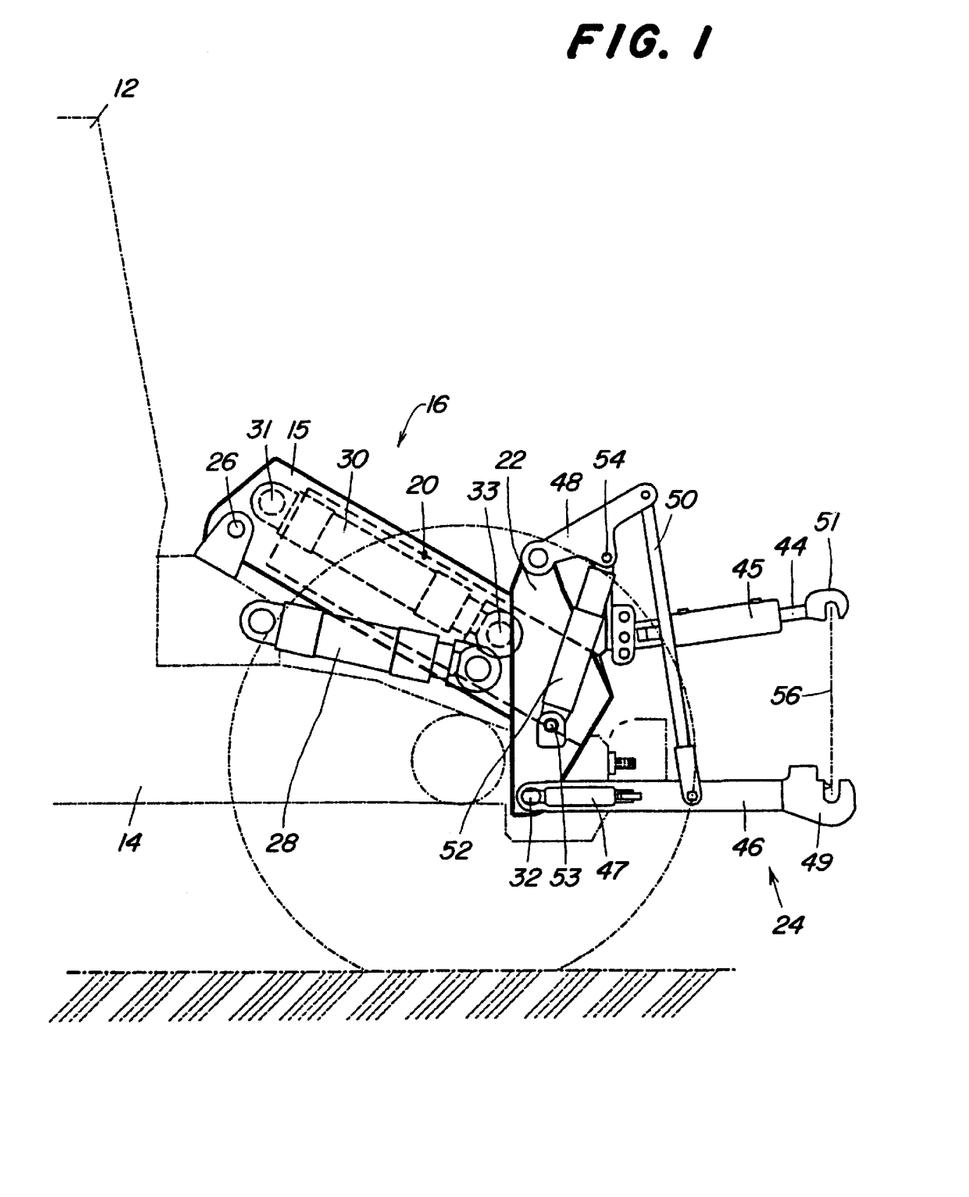
FIG. 1 is a side view of the rear region of a vehicle with an implement interface according to the present invention shown in a lowered, work position.
Figure 2:
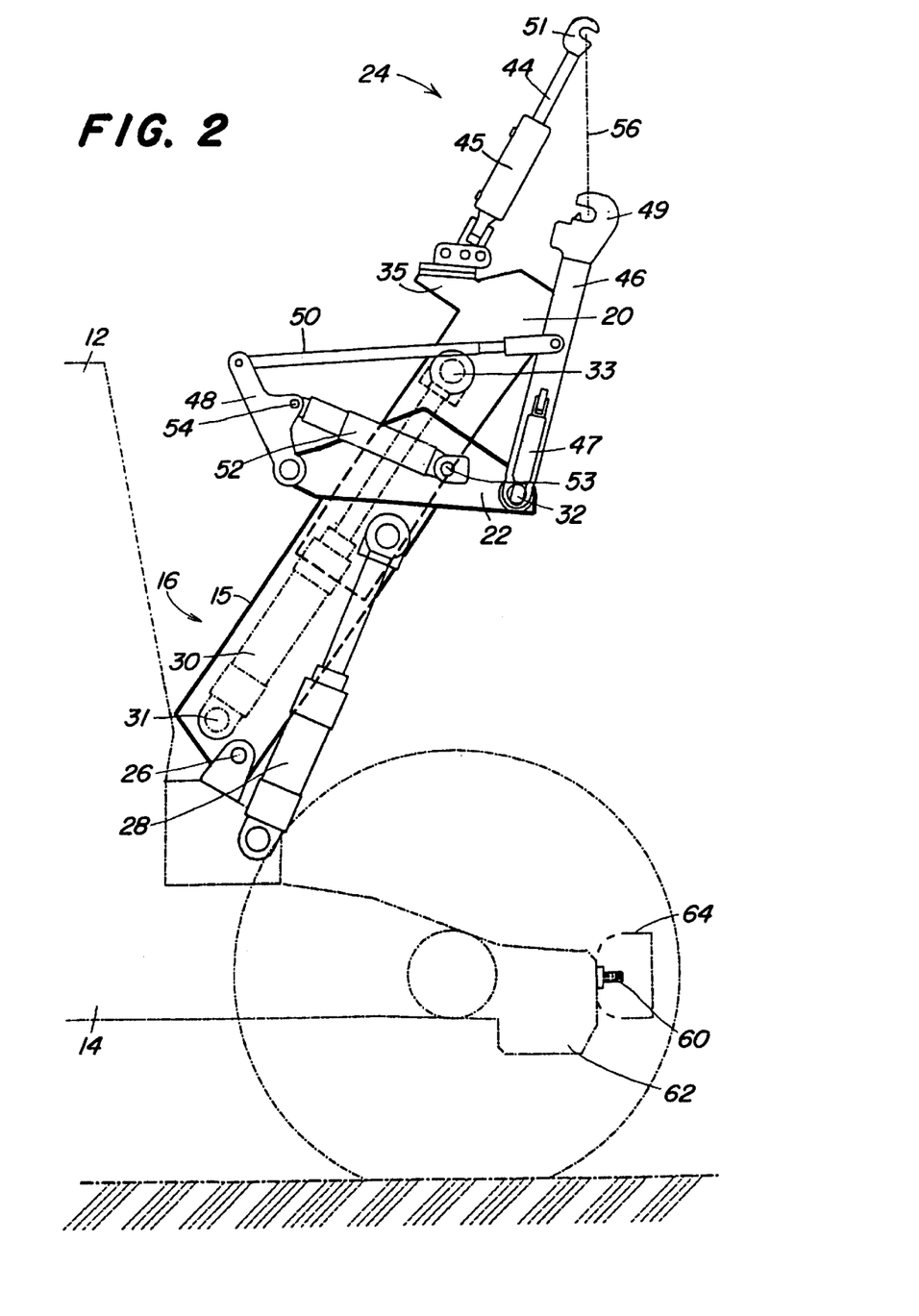
FIG. 2 is a side view of the implement interface of FIG. 1, with the implement interface in a raised position.

The Figures show the rear portion of a vehicle with a rear implement interface which is adjustable in height. The vehicle may be a conventional towing vehicle with a center or front seat and with four wheels of similar size, such as conventional Fasttrac or MBtrac. As shown in FIGS. 1 and 2, a boom 16 is mounted on the vehicle between the driver's cab 12 and the rear axle, and in the center relative to the width of the vehicle, and is pivotally coupled to a coupling point or pivot support 26 which is fixed rigidly to the chassis 14. This boom 16 is pivoted in the vertical direction by two pivoting cylinders 28 which are arranged on both sides of the boom 16. Each cylinder 28 has one end coupled to the chassis 14 and a second end coupled to an outer surface of the boom 16.

A carrier 22 is rigidly mounted on the free end of the boom 16. Two lateral lower rearwardly extending linkages 46 are pivotally coupled to the carrier 22 at coupling points 32. The lower linkages 46 can be raised and lowered by corresponding lifting arms 48 and lifting braces 50 which are coupled to the carrier 22. At their free ends, the respective lower linkages contain couplers 49.

The lifting arms 48 are actuated by lifting cylinders 52, wherein one end 53 of each cylinder is pivotally coupled to the carrier 22, and the other end of each lifting cylinder engages a coupling point 54 of the corresponding lifting arm 48 in an articulated fashion. The transverse movement of the lower linkages 46 can be limited by conventional stabilizer linkage 47.

The boom 16 includes a housing 15 and an arm 20. The arm 20 is slidably received by the housing 15, and is axially extended and retracted by an arm cylinder 30. One end 31 of cylinder 30 is coupled to the housing 15, and the other end 33 is coupled to the arm 20. To save space, the cylinder 30 is mounted inside the housing 15 and the arm 20. As best seen in FIG. 2, the arm 20 has a free end which projects out of the housing 15 and carries an upwardly projecting bearing block 35, to which is coupled an upper linkage 44. The upper linkage 44 integrally includes a hydraulically actuated upper linkage cylinder 45 which is operable to adjust the length of the upper linkage 44. A coupler 51 is mounted on the free end of the upper linkage 44. The arm 20 can be extended and retracted relative to the boom housing 15 together with the upper linkage 44 by actuating the arm cylinder 30. Consequently, the position of the coupler 51 of the upper linkage 44 can be changed by actuating the arm cylinder 30 as well as by actuating the upper linkage cylinder 45.

The couplers 49 of the lower linkages 46 and the coupler 51 of the upper linkage 44 form an implement interface configured as a three-point hitch 24 which is able to receive implements (not shown) or adapters (not shown) for mounting special implements (not shown). The couplers 49 of the lower linkages 46 may also be connected to the coupler 51 of the upper linkage 44 by a mast that lies in the coupling plane 56. Additional implements (not shown) may also be directly mounted to the vehicle chassis 14.

A power take-off shaft 60 projects out of a power take-off shaft gear housing 62. The power take-off shaft gear housing 62 is connected to a gear housing (not shown) of the vehicle.

The power take-off shaft 60 is covered by a conventional power take-off shaft protection shield 64.

The described implement interface is able to operate in two modes—a working or towing mode and a lifting mode. FIG. 1 shows the boom 16 in its lowered and locked position for the working mode. This position represents the transport position as well as the work position for all tasks performed with the three-point hitch 24. The carrier 22 is rigidly connected and locked to the vehicle chassis 14 by means of a locking mechanism that is described in detail below. All loads are directly introduced into the vehicle chassis 14 from the carrier 22 via the locking mechanism such that the boom 16 is unloaded. In this position, the power take-off shaft 60 of the vehicle can be connected to an input shaft of the implement, and not-shown electric and/or hydraulic connections for transmitting power and signals between the vehicle and the implement can be produced. The working mode is activated after the implement is coupled to the vehicle by actuating the lock. The working mode corresponds to that of a conventional three-point hitch.

In the lifting mode, the boom 16 is unlocked and can be pivoted in the vertical direction by the pivoting cylinders 28. FIG. 2 shows the boom 16 in a raised position. In the lifting mode, lifting and loading tasks can be carried out, and implements which were stored at a high elevation can be connected and disconnected. For example, implements can be loaded onto and unloaded from trailers or stored on shelves in this mode.

The alternative embodiment shown in FIGS. 3 and 4 essentially differs from that of FIGS. 1 and 2 only with respect to the design of the boom 16, as described in greater detail below. Identical components or components that correspond to one another are identified by identical reference symbols in FIGS. 1–4.

Figure 3:
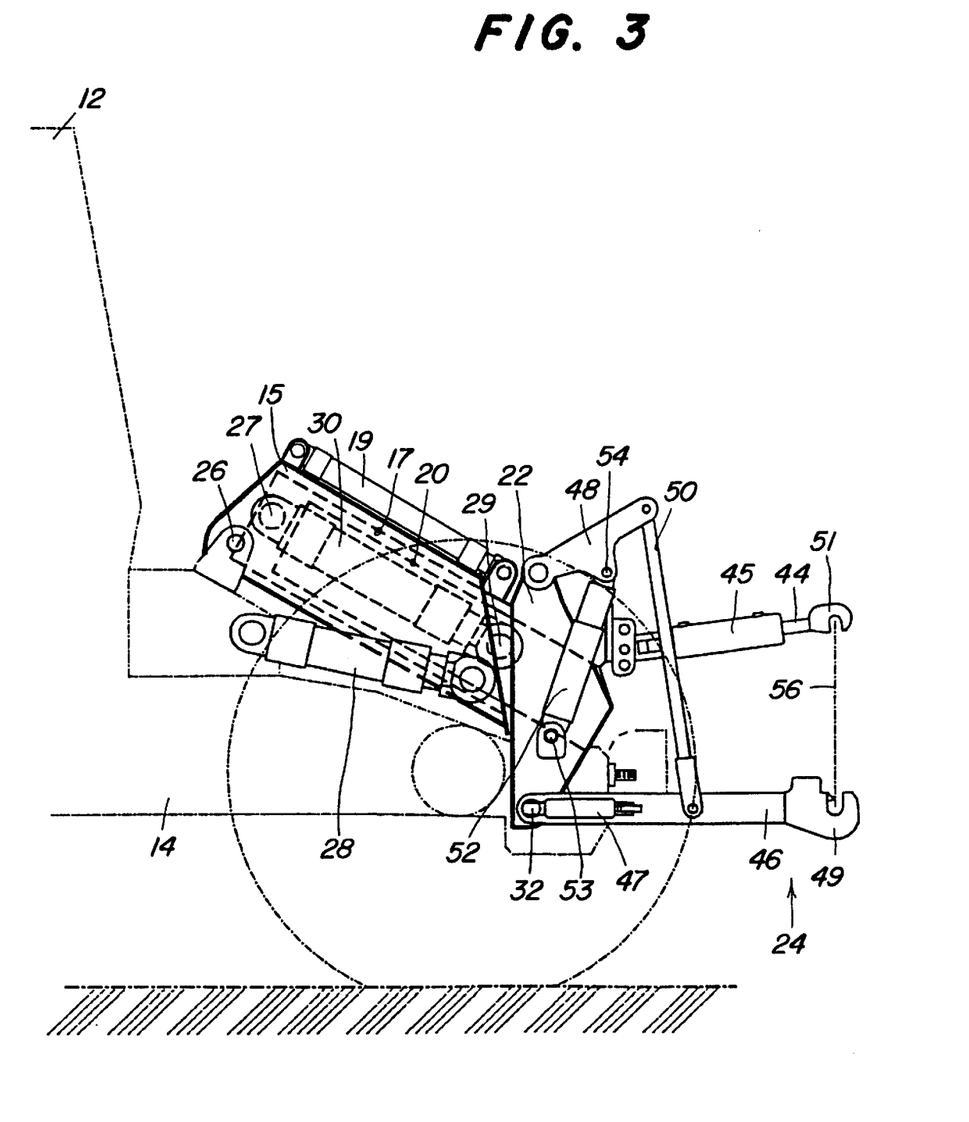
FIG. 3 is a side view of the rear region of a vehicle with an implement interface according to an alternate embodiment of the present invention shown in a lowered, work position.
Figure 4:
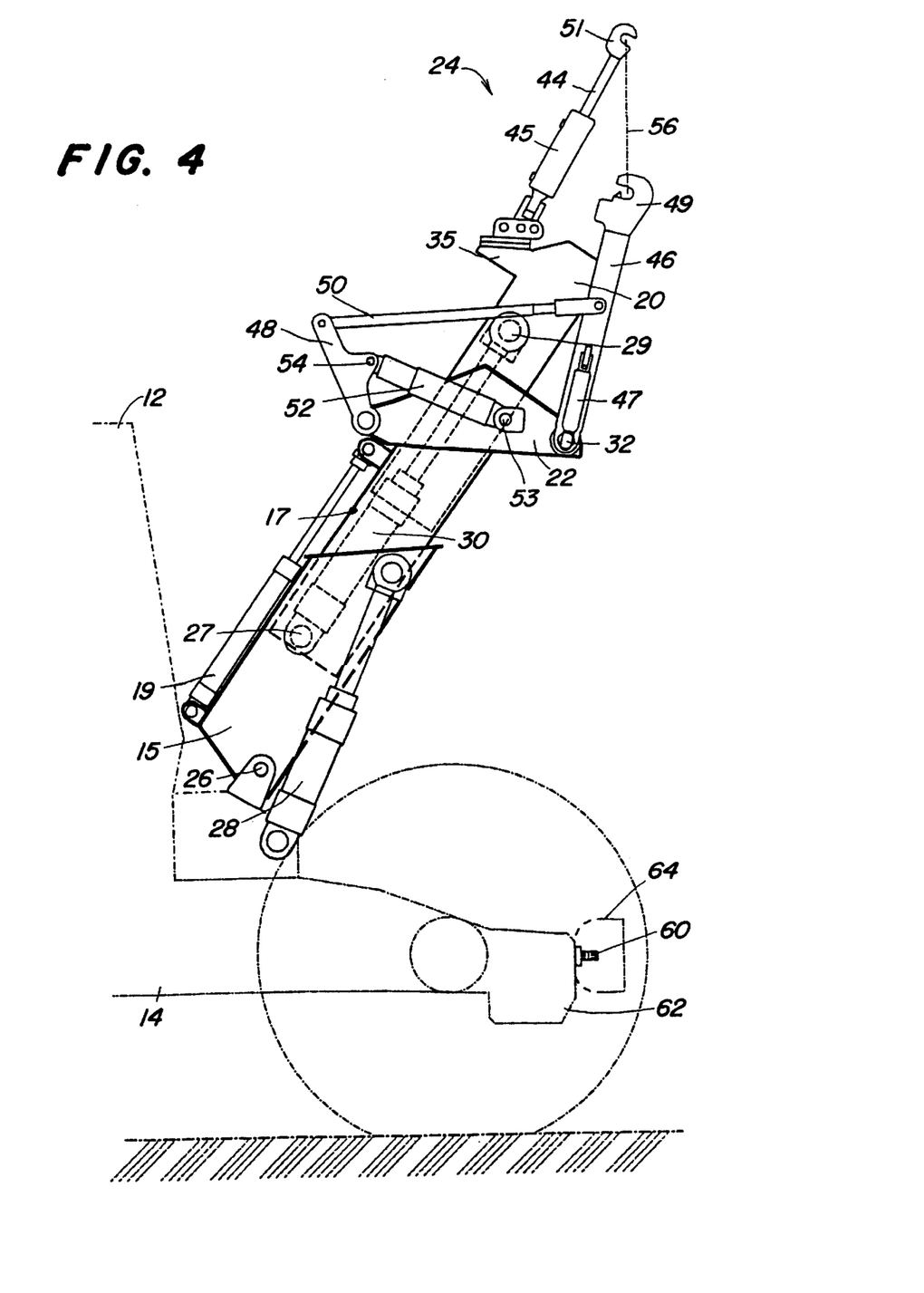
FIG. 4 is a side view of the implement interface of FIG. 3, with the implement interface in a raised position.

Referring now to FIGS. 3 and 4, the boom 16 includes an outer housing 15 which is pivotally coupled to the chassis at pivot 26, and an extendable insert or inner housing 17 that is guided inside the outer housing 15 in a telescopic fashion. The outer housing 15 can be pivoted in the vertical direction by pivoting cylinders 28, similar to the housing 15 of FIGS. 1 and 2. The insert or inner housing 17 can be extended and retracted with respect to the outer housing 15 by an extension cylinder 19 which is mounted above the outer housing 15. The cylinder 19 has one end coupled to the outer housing 15 and another end coupled to the inner housing 17. A carrier 22 (similar to that of FIGS. 1 and 2) is mounted on the free end of the inner housing 17, which protrudes out of the outer housing 15.

An arm 20, similar to the arm of FIGS. 1 and 2, is movably received inside the insert 17. The arm 20 is extended and retracted in the axial direction inside the insert 17 by cylinder 30. One end 27 of the cylinder 30 is coupled to the insert 17 and its other end (29) is coupled to the arm 20. To save space, the cylinder 30 is also preferably arranged inside the insert 17 and the arm 20.

In the embodiment of FIGS. 1 and 2, only a portion of the implement interface 24 is telescopically extendable. For example, the couplers 32 of the lower linkages on the side of the tractor cannot be extended, but only pivoted vertically by the lifting cylinders 52. The coupling plane 56 is aligned by retracting and extending the upper linkage 44 by means of the arm cylinder 30 and/or the upper linkage cylinder 45. In the embodiment of FIGS. 3 and 4, the entire implement interface 24 is telescopically extendable. For example, the lower linkages 46 and the upper linkage 44 can be collectively extended when cylinder 19 moves the insert 17. This permits horizontal movement of the implement interface 24 and increases its lifting range. In the embodiment of FIGS. 3 and 4, the coupling plane 56 can also be aligned by retracting and extending the upper linkage 44 by means of the arm cylinder 30 and/or the upper linkage cylinder 45.

In addition to the towing mode and the lifting mode described above with reference to FIGS. 1 and 2, the embodiment of FIGS. 3 and 4 allows another operating mode that is not illustrated in detail. In this operating mode, the boom 16 may be unlocked analogously to the lifting mode. The insert 17 can be extended and retracted while the boom 16 (housing 15) is lowered. Consequently, this lowered position makes it possible to move the implement interface 24 into the vicinity of implements and to receive these implements without having to move the vehicle. For example, the coupling of an implement or trailer on the ground can be grasped in this position. Consequently, the interface can function as tractor coupling and/or as a pick-up hitch. Depending on the design of the boom, the interface can function as a rigid tow-bar (by means of a partial extension), and the interface can function as a height-adjustable tractor coupling (by means of raising/lowering). If the insert 17 is extended and the pivotable arm 15 is in its lower position, the couplers 49 of the lower linkages 46 can, assume positions that are lower than the ground surface. Consequently, the embodiment shown in FIGS. 3 and 4 is also suitable for digging with earth scoops and the like, without moving the vehicle.

As mentioned previously, and as best seen in FIG. 5, the carrier 22 can be locked relative to the vehicle chassis 14. This locking function may, for example, be realized with two catch hooks 40 that are open toward the top and fixed on each of the two axle hubs 42 such that they are laterally offset from the longitudinal axis of the vehicle. However, if the axle is mounted on springs, it is proposed to mount the catch hooks 40 on the vehicle chassis 14. This locking mechanism may be also be used with the embodiments of FIGS. 1–4.

Figure 5:
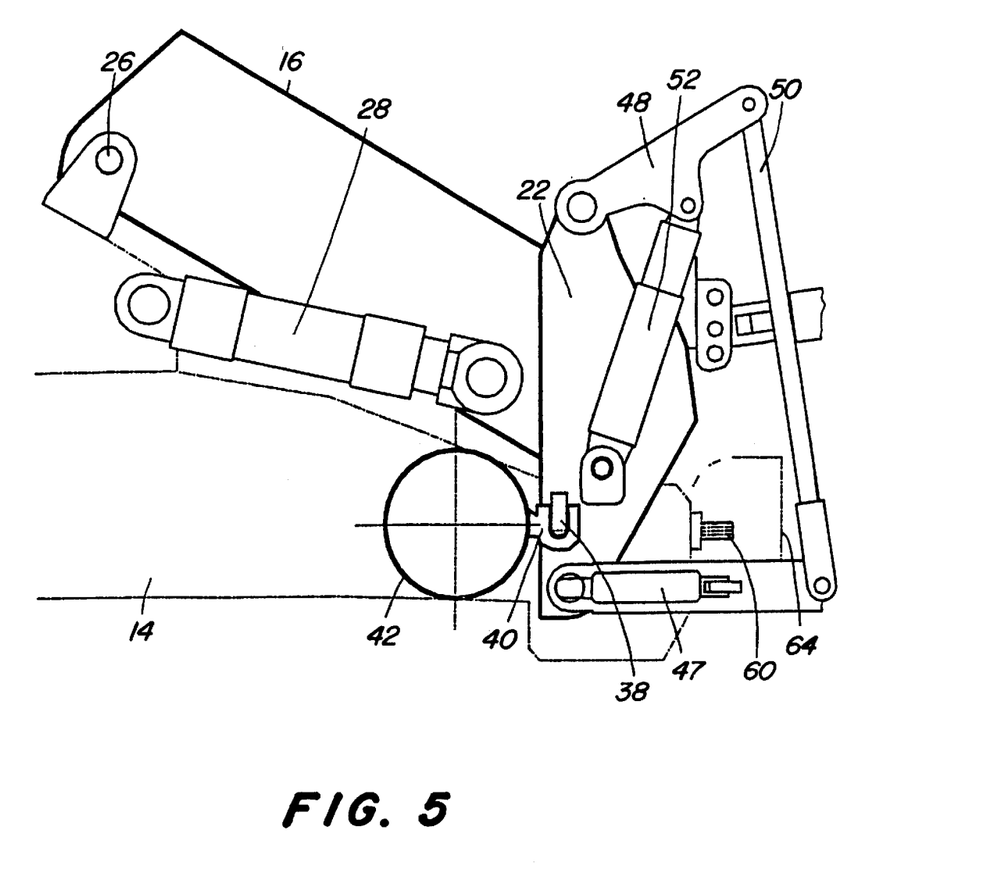
FIG. 5 is a side view of the rear region of a vehicle with an implement interface according to the present invention with a locking device for a three-point hitch.

The hooks 40 include upwardly opening slots which receive two projections 38 which project laterally from the sides of the carrier 22. The projections can also be locked into the slots of the catch hooks 40 by means of a locking mechanism (not shown). For example, locking mechanisms of the type used for rapid-action couplers of lower linkages may be used. Alternatively, bores and bolts (not shown) may be used to locking together the carrier 22 and the vehicle chassis 14. When the carrier 22 is locked to the vehicle chassis 14, the carrier 22 and the implement interface are fixed relative to the vehicle chassis 14 and unable to move relative to the vehicle chassis during transport or while performing tasks with a implement. This is useful for tasks involving a power take-off shaft.

Once the carrier and the vehicle are interlocked, the forces transmitted by the carrier 22 are transmitted directly to the rear axle or to the vehicle chassis 14, without being applied to the boom 16 (or the housing 15 and the insert 17). Consequently, tensile stresses are directly transmitted to the vehicle chassis; in particular, during towing and transport tasks, so that the boom 16 (or the housing 15 and the insert 17) are unloaded in these operating modes. Consequently, the boom can be designed for relatively small loads.

Figure 6:
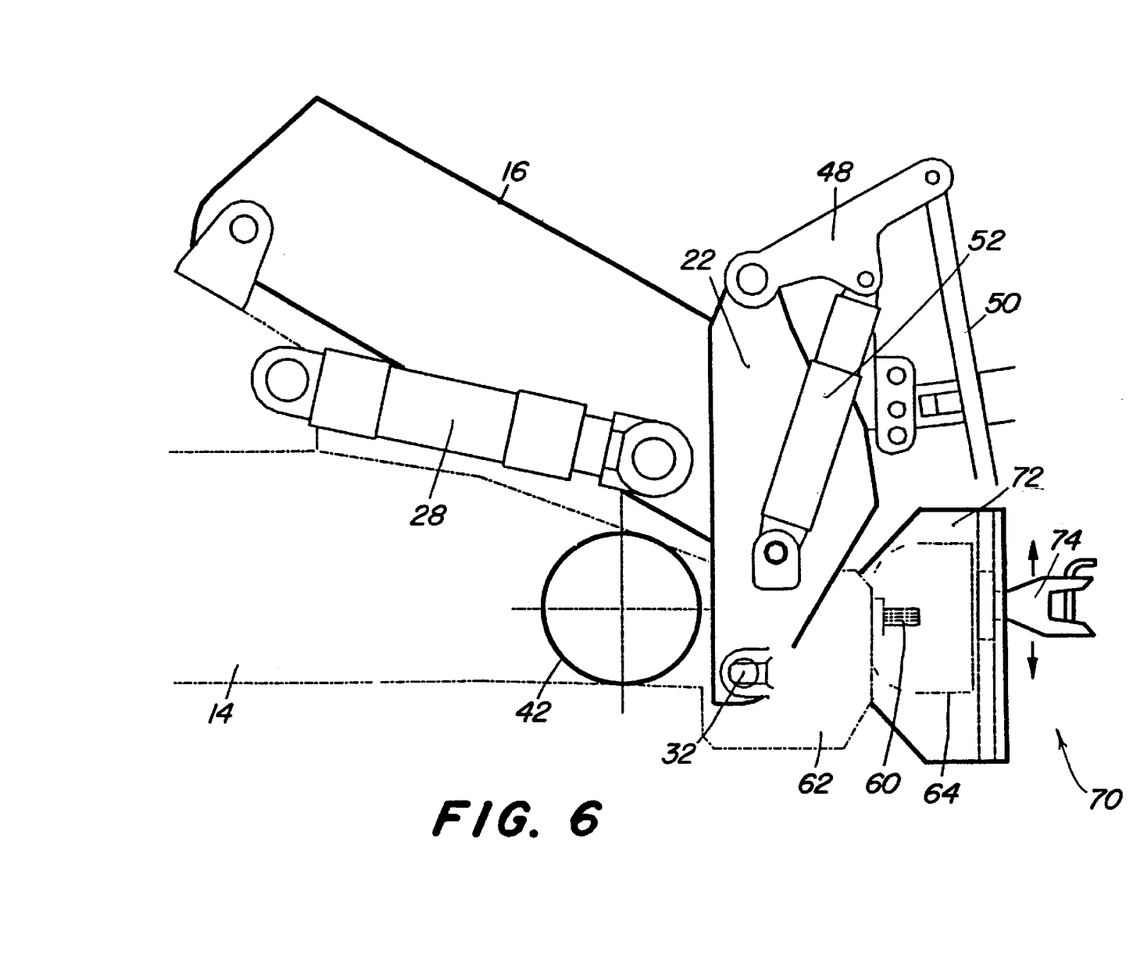
FIG. 6 is a side view of an implement interface according to the invention with a towing implement mounted on the vehicle chassis.
Figure 7:
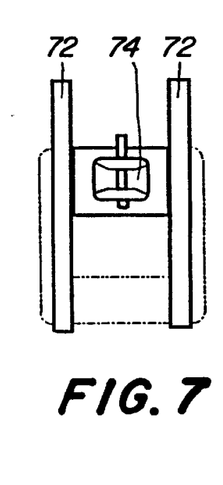
FIG. 7 is a rear view of the implement interface of FIG. 6.

In FIGS. 6 and 7 a coupler 70 is mounted on the power take-off shaft gear housing 62. This coupler 70 is height-adjustable with two lateral guide rails 72 that guide a coupler member 74 which can be adjusted vertically and locked at different heights. Since the coupler 70 is mounted on the stationary power take-off shaft gear housing 62, the vertically adjustable rear interface (22, 48, etc.) is not stressed when implements are attached to coupler 70.

Figure 8:
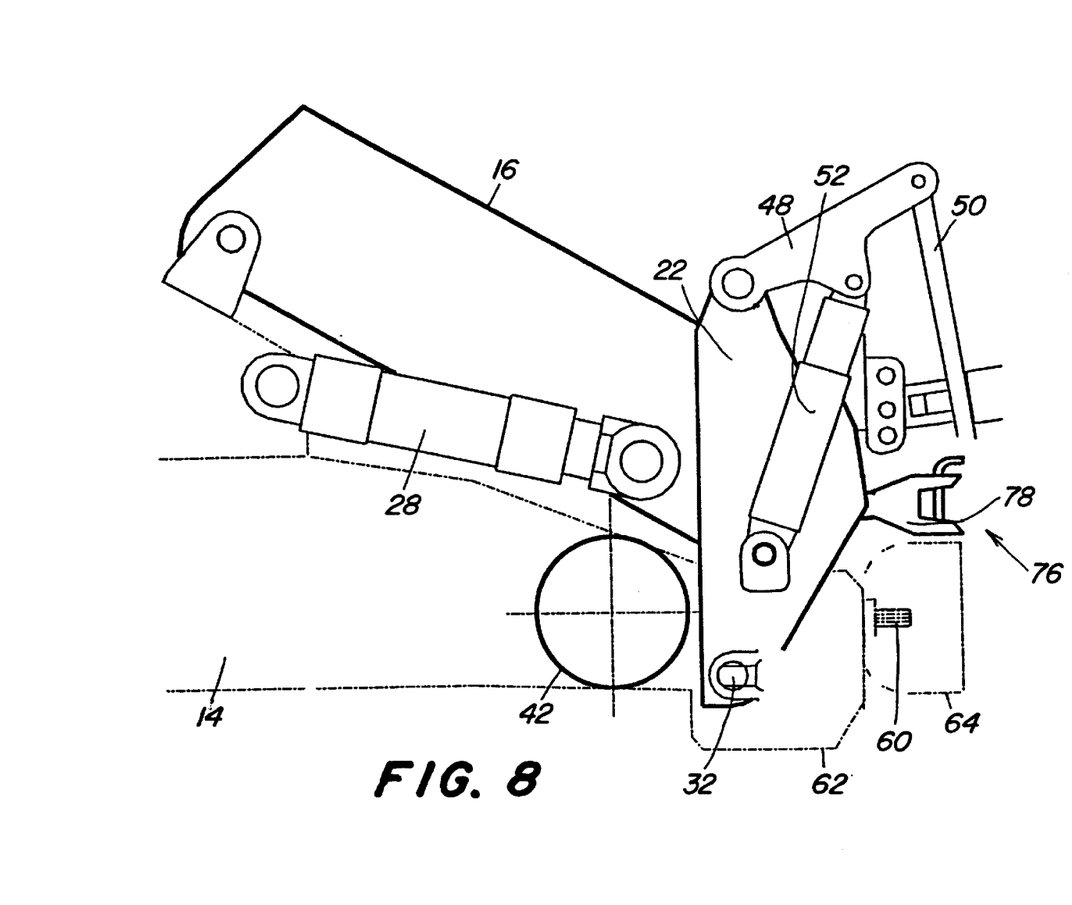
FIG. 8 is a side view of an implement interface according to the invention with a towing implement mounted on a three-point hitch.
Figure 9:
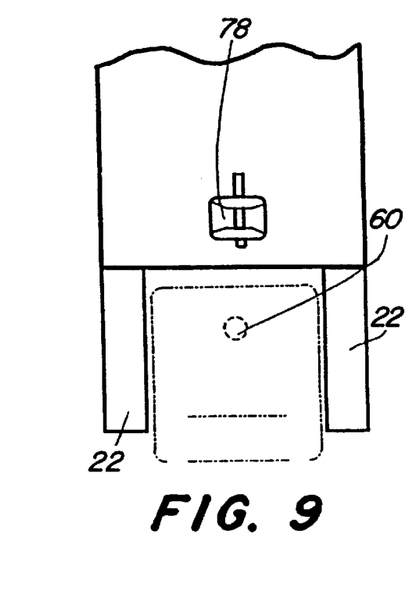
FIG. 9 is a rear view of the implement interface of FIG. 8.

FIGS. 8 and 9 show an alternative embodiment of a hitch 76 wherein a coupler 78 is mounted on the carrier 22. This embodiment is simpler than the embodiment of FIGS. 6 and 7 because the guide rails 72 can be eliminated. In this case, the height of the coupler 78 is controlled by adjusting the height of the boom 16 with double acting cylinders 28. Although not shown, the embodiment of FIGS. 8 and 9 also preferably includes a double-acting extension cylinder and a double-acting arm cylinder 30 which are supplied with hydraulic fluid from the vehicle hydraulic system (not shown). These hydraulic cylinders are preferably actuated by control units (not shown) located in the vehicle cabin 12 which operate hydraulic valves (not shown) to control the flow of hydraulic oil thereto. The lifting cylinders 52 may be conventionally actuated and controlled. A known level control (not shown in detail) may be used to control the cylinders 28, the extension cylinder, the arm cylinder and, if required, an upper linkage cylinder, so as to maintain a coupling plane in a desired operating position while the implement interface is raised or lowered.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A hitch assembly for coupling an implement to a chassis of a vehicle, the assembly comprising:
   a boom pivotally coupled to the chassis, the boom having a housing pivotally coupled to the chassis, an arm slidably and telescopically received by the housing;
   an arm cylinder having a first end coupled to the housing and a second end coupled to the arm, the arm cylinder being mounted inside the housing and operable to extend and retract the arm;
   a carrier fixed to an end of the housing;
   lower linkages coupled to the carrier;
   an extendable upper linkage coupled to an end of the arm; and
   a pivot cylinder coupled between the chassis and the boom and operable to vertically pivot the boom.

2. The hitch assembly of claim 1, further comprising:
   a locking mechanism for fixing the boom relative to the vehicle chassis.

3. The hitch assembly of claim 1, characterized by:
   a lifting arm is coupled to the carrier;
   a lifting brace connecting the lifting arm to one of the lower linkages; and
   a lifting cylinder for vertically pivoting the lifting arm.

4. The hitch assembly of claim 1, wherein the arm is guided by the boom and is slidable in a longitudinal direction of the boom.

5. The hitch assembly of claim 1, wherein:
   the upper linkage includes an upper linkage cylinder operable to adjust a length of the upper linkage.

6. The hitch assembly of claims 1, wherein:
   the boom is coupled to a portion of the vehicle between a driver's platform and a rear axle.

7. The hitch assembly of claim 1, wherein:
   the housing comprises an inner housing slidably received by an outer housing, the arm being slidably received by the inner housing; and
   the carrier is mounted on an end of the inner housing.

8. The hitch assembly of claim 7, wherein:
   a pressure-operated piston/cylinder unit is coupled between the outer housing and the inner housing in order to extend and retract the inner housing.

* * * * *